Oct. 29, 1968

R. G. RUSHING 3,407,482

METHOD OF DISPLACING AND COMPACTING END TURN
PORTIONS OF WINDINGS USEFUL IN
INDUCTIVE DEVICES

Filed July 28, 1966

INVENTOR.
Raymond G. Rushing
BY
Attorney.

United States Patent Office 3,407,482
Patented Oct. 29, 1968

3,407,482
METHOD OF DISPLACING AND COMPACTING END TURN PORTIONS OF WINDINGS USEFUL IN INDUCTIVE DEVICES
Raymond G. Rushing, Mentor, Ohio, assignor to General Electric Company, a corporation of New York
Filed July 28, 1966, Ser. No. 568,592
10 Claims. (Cl. 29—596)

Background of the invention

This invention relates generally to an improved method for displacing and compacting the end turn portions of windings useful in induction devices and more particularly to an improved method for pressing back and compacting from an original to a final position the end turn portions of coils carried by wound motor stators.

In the manufacture of electrical induction devices carrying one or more coils of insulated conductor wires, it is normally necessary to press or push back the end turn portions of the coils away from the bore of the device. This is required since the end turn portions may otherwise interfere with the operation of the device. Further, in certain wound stator applications, it is desirable to press back and compact the end turn portions of the windings or coils without affecting the relative position of the coil side portions in the stator slots, as for example when the coil winding equipment includes slot pressback features which accomplish the placement of the coil side portions.

The usual way to effect such pressing back and compaction of the end turn portions is by various mechanical means operating directly upon the end turn wires. This method has provide to be deficient because the direct physical contact between the mechanical means and the wires involved may result in damage to the wire insulation. Further, the mechanical means itself usually involves complicated and bulky machinery, with attendant high initial and operating costs. Finally, it is difficult to press back the end turn portions mechanically without causing some undesirable relative movement of the coil side portions in the core slots.

Summary of the invention

Accordingly, it is a general object of the present invention to provide an improved method for displacing the end turn portions of the coils of electrically conductive wires for use in electrical induction devices, from initial to desired positions.

Another object of the present invention is to provide an improved method of pressing back and compacting the end turn portions of electrical coils without damaging the wire insulation or unduly moving the coil side portions.

A further object of the present invention is to provide an improved method of pressing back either one or both sets of end turn portions of a group of electrical coils.

In carrying out the invention in one form, I provide an improved method for displacing from an initial position adjacent the bore of a magnetic stator core at least one set of end turn portions of a number of electrical coils carried by the core. An induction coil is non-movably supported in close proximity to only the one set of end turn portions with preselected regions of the one set of end turn portions generally parallel to the induction coil and the remainder of the electrical coils generally non-parallel thereto. The electrical coils are electrically connected to provide a closed path for the flow of induced current. By way of exemplification, when my method is applied to a four-pole motor stator, suitable interpole connections may be made between the four electrical coil groups to achieve a series circuit which will produce all like magnetic poles when energized. In other words, the electrical coil groups will be connected to produce additive rather than opposing current flow therethrough. These interpole connections entail electrically connecting each end of each coil group to one end of an adjacent group. Accordingly, my invention is especially useful, although not limited to application with stators wound by those winding machines which place each coil group separately, leaving the ends free for interpole connections to be made in a subsequent operation.

In accordance with the operating principles of my invention, at least one high energy pulse of predetermined magnitude is injected into the induction coil, producing a heavy transient current flow in the turns of the induction coil. This transient flow establishes a dynamic magnetic flux field about the induction coil, which field couples with the preselected regions of the one set of end turn portions, inducing current to flow in the stator coils in a direction opposed to the current flowing in the induction coil. The instantaneous current flowing through the induction coil and the electrical coils creates a high flux density therebetween at the area of magnetic coupling thereby causing the one set of end turns to be displaced by the resulting interaction of forces.

When the end turn portions being displaced are the end turns of electrical coils carried in the stator, the displacement is radially away from the stator bore and axially towards the stator end face. Moreover, besides the displacement of the end turn portions, since the current in each conductor is in the same direction, causing attracting forces therebetween, there will also be compaction of the individual conductor wires of the end turn portions into a compact bundle.

In accordance with a further aspect of this invention, I provide an improved method for displacing both sets of end turn portions of a number of electrical coils carried by a core. A generally non-magnetic and rigid structure capable of conducting eddy currents is positioned in close proximity to the other set of end turn portions while the induction coil is located adjacent the one seat as set forth above. The electrical stator coils are connected to provide a closed electrical path and the induction coil as energized causing a transient current flow through the induction coil and the stator coils. The current flowing through the stator coils also causes transient eddy currents to flow in the structure. These eddy currents cause the flux lines emanating from preselected regions of the other set of end turn portions to be restricted to a path between the structure and the end turns, and thus the other set of end turn portions is displaced similarly to the one set. Of course, the one set of end turn portions is displaced at the same time.

I also contemplate another method of displacing both sets of end turn portions of the core-carried coils according to my invention. A first induction coil connected to carry current in a first direction is positioned adjacent one set of the coil end turn portions. A second induction coil connected to carry current in a direction opposite to the first induction coil is positioned adjacent the other set of end turn portions. Upon injection of energy into both induction coils, both sets of end turn portions are pressed back by the induced interaction of electromagnetic forces.

The improved method of my invention makes it possible to press back the end turn portions of electrical coil groups carried for example by motor stators, without affecting the relative position of the coil sides. This is accomplished without the use of complex and costly mechanical press-back machines as in the prior art and without damage to the wire insulation.

Brief description of the preferred embodiments

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings in which:

Figure 3:
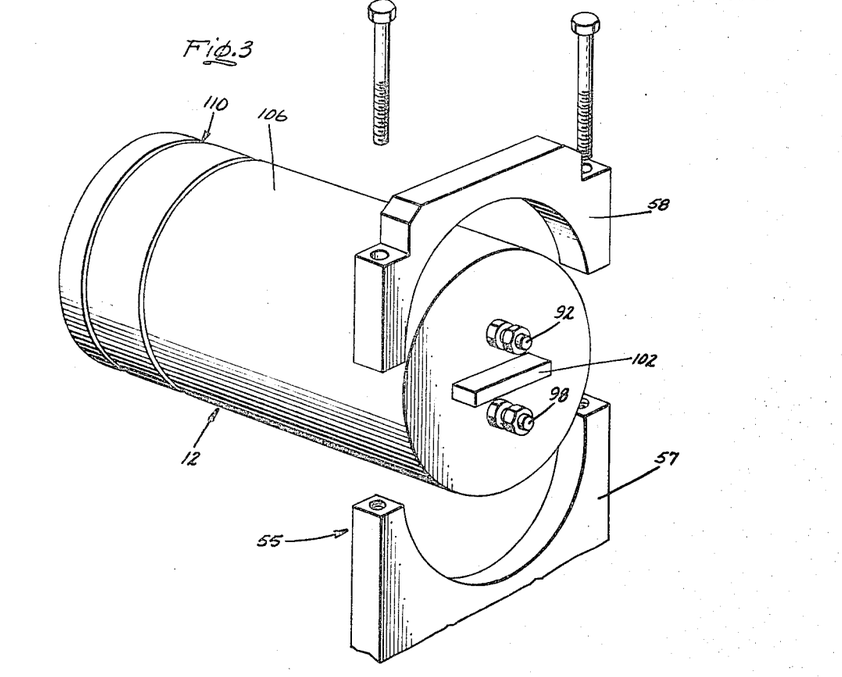
FIGURE 3 is a perspective view of an induction coil carrying member, illustrated in FIGURES 1 and 2, including an exemplification of the supporting fixture used therewith.
Figure 4:
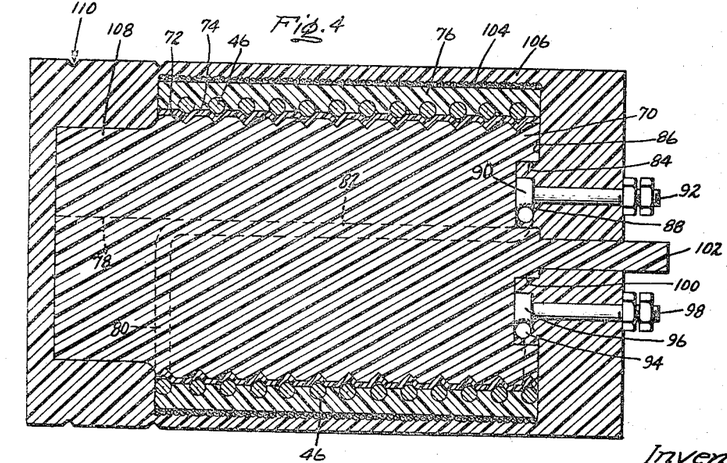
FIGURE 4 is a vertical section view of the induction coil carrying member illustrated in FIGURE 3.
Figure 5:
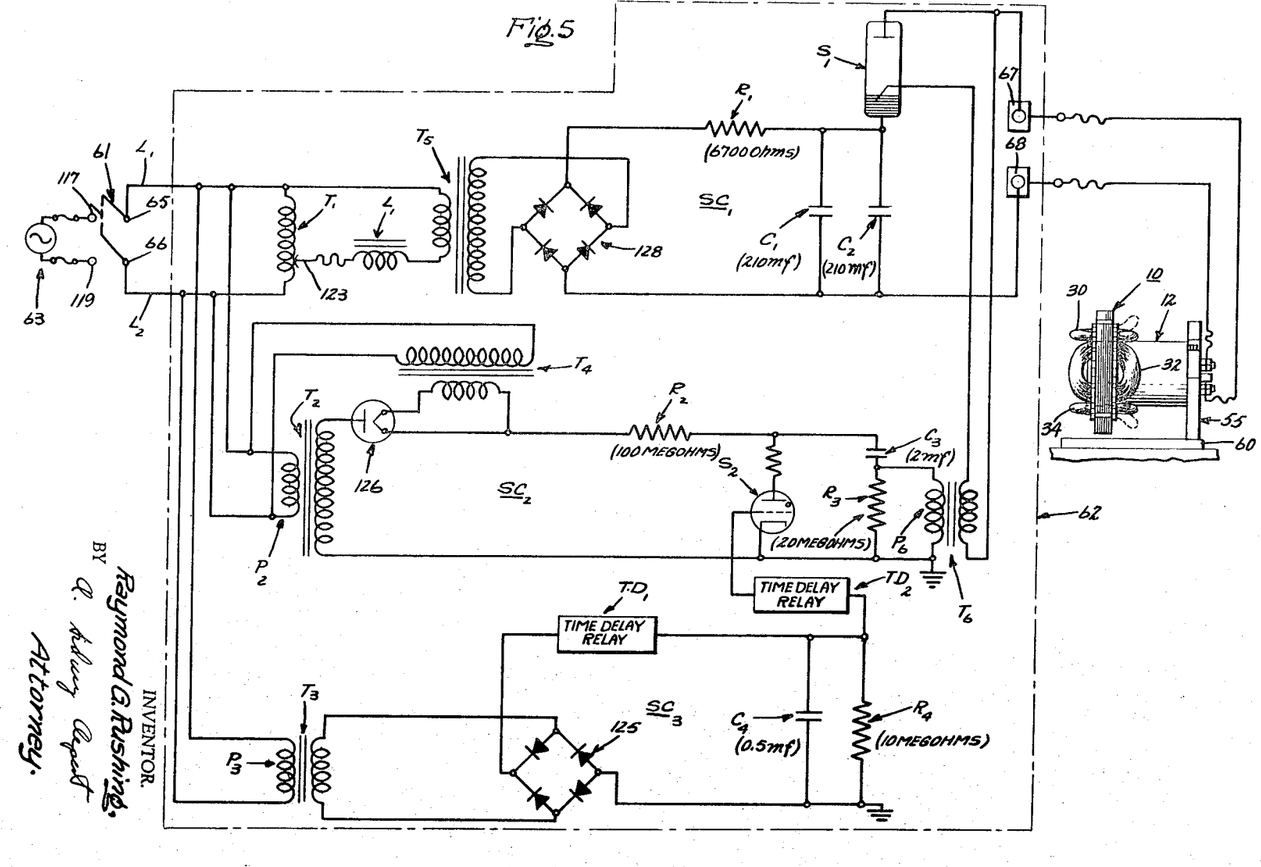
FIGURE 5 is a circuit diagram depicting an electrical energy surge source for generating high energy surges of short duration which is employed in practicing the method of the present invention.

Referring now to FIGURES 1–4 in conjunction with FIGURE 5, I have illustrated therein a first aspect of my invention as applied to a four-pole motor stator of a dynamoelectric machine generally denoted by reference number 10, which stator 10 comprises a plurality of relatively thin laminations (.025 inch nominal thickness) of ferromagnetic material. In these figures, and specifically FIGURES 1 and 2, I have shown the stator core 10 having an induction coil carrying member 12 supported in rigid relationship to the bore 14 of the core 10. The bore 14 is defined by a plurality of angularly spaced apart tooth sections 16 which project inwardly from a yoke section 18 of the core. In the core illustrated in FIGURES 1 and 2, there are 36 such tooth sections, adjacent tooth sections defining therebetween a corresponding number of angularly spaced apart slots 20, closed at the rear end and opening at the inner end to the bore 14. Further, each slot 20 extends the full axial length of the core. Each slot 20 has provided therein a generally U-shaped slot liner 22, which liners are of suitable electrical insulating material such as polyethylene plastic or the like, the liners being provided for purposes of insulation and having end portions 24 extending axially beyond each end face 26 and 28 of the core 10.

Figure 1:
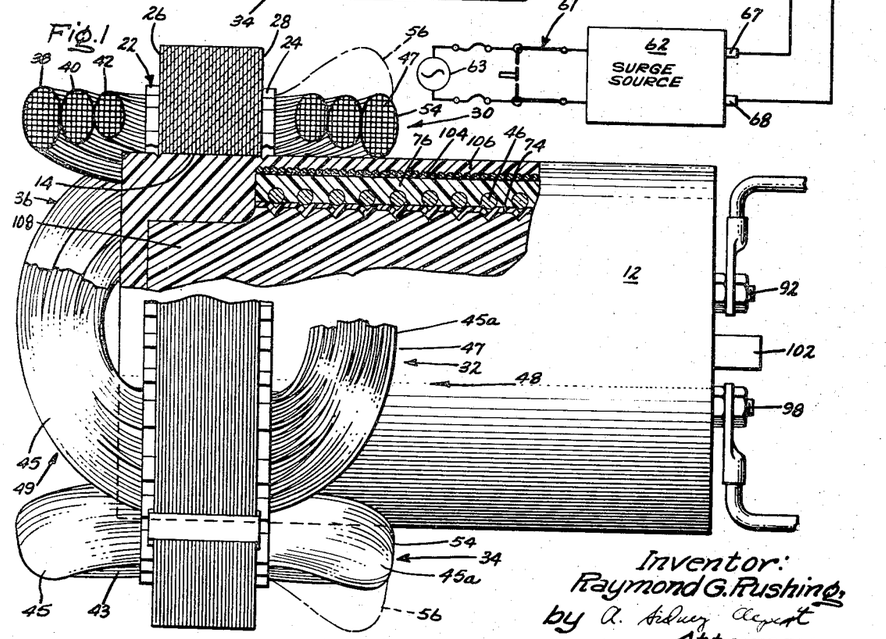
FIGURE 1 is a side elevational view, partly broken away illustrating apparatus for accomplishing the end turn displacing method of my invention, with a dynamoelectric machine stator core carrying a distributed type winding shown before displacement in the figure with regions of several of the end turn portions of the winding in close proximity to a coil which is in turn connected to an energy surge source capable of supplying the requisite electrical energy surge for carrying out the method.
Figure 2:
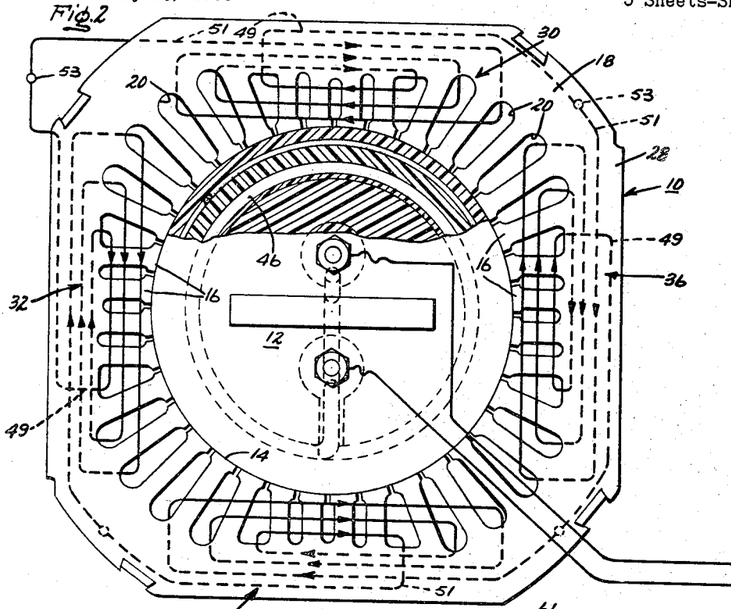
FIGURE 2 is an end view, partially broken away, of the stator core, winding, and apparatus seen in FIGURE 1 with the distribution of the coils comprising the winding and their connections to an energy surge source illustrated schematically.

It will be noted that the core 10 shown in FIGURES 1 and 2 has the main field winding already accommodated in the slots of the core. In this exemplification, the main field winding is of the distributed type and is defined by four identical coil groups 30, 32, 34, and 36 with each group being formed by three serially connected concentric coils 38, 40, and 42, referring respectively to the outermost, intermediate and innermost coils of each group. The coils 38, 40, and 42 include a predetermined number of insulated wires of electrically conductive material, such as aluminum or copper, having a suitable electrically insulative coating adhering to the outer surface thereof. Each coil 38, 40, and 42 includes two side portions carried in the slots 20 and two end turn portions 45 and 45a projecting beyond the opposite faces 26 and 28 of the core respectively.

The main field winding, prior to being acted upon in accordance with this exemplification of my invention, is placed in the stator core 10 by a suitable winding machine of the type that places each coil group separately, such machines being commercially available and hence well known in operation. My method is especially useful with such machines which place each coil group separately inasmuch as the terminal ends of each coil group are thereby left free as denoted by reference numerals 49 and 51 in FIGURE 2. With such free ends, suitable interpole connections 53 may be made in order to electrically connect the coil groups to provide a closed path for the flow of current therethrough without the necessity of providing interpole connections by separately severing the windings.

It should be understood that each coil of the main field winding illustrated in FIGURES 1 and 2 may have the side portions thereof already pressed back into the stator slots if desired. This pressing back may be accomplished by a coil winding machine such as disclosed in the United States Patent to Gene Pollard, No. 2,506,173, granted May 2, 1950. The Pollard machine is well known in the art, and will also mechanically press back the end turn portions 45 and 45a if desired. However, it has been found that such mechanical pressing back of the end turn portions has a deleterious effect on the conductor wires since the wire insulation is often cracked or otherwise adversely effected thereby. Accordingly, this exemplification of my invention contemplates that the end turn portions 45a (hereinafter referred to as end turn set 48) will be pressed back toward the stator core face 28 without mechanical contact with the conductor wires, thus ensuring against possible damage to the insulation. In FIGURE 1, only the end turn portions of coil groups 30 and 34 are illustrated as being moved back from the initial position illustrated by lines in full and denoted by reference numeral 54, to the desired position illustrated by phantom lines and denoted by reference numeral 56. This was done merely to simplify the drawing, and it will be understood that in accordance with the exemplification, the end turn portions of the entire end turn set 48 will be so pressed back or displaced.

In order to perform my method in accordance with this exemplification, it is required that the four coil groups 30, 32, 34, and 36 be electrically short circuited to provide a closed path for current flow by the interpole connections 53. The coil groups are connected so that current will flow in the same direction in each group, shown in FIGURE 2 as clockwise current flow, in order that current flow in the coil groups will be additive. This is, of course, contrary to the normal connections of the coil groups wherein the groups are connected to have opposite current flow and hence opposite polarity when energized. However, in order to achieve additive current flow, such connections are required. It would be possible, on the other hand, to connect only coil groups 30 and 34 or 32 and 36 to provide a closed electrical path, leaving the other pair unconnected and practice my method. Of course, in this case only the end turn portions of the connected coil groups would be pressed back.

After short-circuiting the four stator coil groups, the induction coil carrying member 12 is rigidly supported in the stator bore 14 and a spiral induction coil 46 carried in the member 12 is energized in a manner to be described more fully hereafter. When the member 12 is supported in bore 14, the turns of the spiral coil 46 are generally parallel to preselected regions 47 of end turn set 48 and are generally non-parallel to the remainder of the coil groups, as will be apparent by viewing FIGURES 1 and 2. Since mutual induction occurs only between electrical conductors that lie in the same plane, or are generally parallel, the coil 46 will be electromagnetically linked only to the regions 47, and not to the non-parallel coil sides 43 and the non-parallel portions of the end turns. Hence, little or no force will be transmitted to the coil sides, thus virtually limiting displacement to the end turn portions of the coils. It is necessary for the practice of the exemplification that the coil 46 electromagnetically link only the end turn set 48 and not the other end turns of the coil groups, i.e., the set 49. As will be seen hereinafter, if both sets of end turns are linked, opposing current flow will be induced in the coils, in which case no coil displacement will occur.

In order to appreciate the operation of this exemplification of my invention, it will be necessary to refer now to FIGURES 3, 4 and 5 in conjunction with FIGURES 1 and 2. It will be seen that the induction coil carrying member 12 is supported in bore 14 by a holding fixture 55 comprising a lower fixture portion 57 and upper fixture portion 58. As will be noted in FIGURE 5 for example, the member 12 is supported in the holding fixture 55 which is in turn supported on a base 60, with the stator core 10 and the coil groups 30, 32, 34, and 36 being supported on the member 12. It will also be noted, in FIGURES 1 and 2 for example, that the outer diameter of the member 12 is substantially equal to the diameter of the bore 14, thereby providing a tight fit of the stator core 10 on the member 12, eliminating any possible radial movement of the stator core on the member, and the member 12 also serving to hold the coil side portions 43 in place if so desired.

The spiral induction coil 46 is supported in close proximity to the preselected generally parallel regions 47 of end turn set 48. With the coil groups short circuited to provide a closed path for induced current, a high energy surge or pulse of electrical power is injected into the spiral induction coil 46 by closing the switch 61 which connects a high energy surge source 62 to an input source of alternating current 63. This pulse produced a dynamic current flow in coil 46 which establishes a dynamic magnetic field about the coil. The dynamic magnetic field induces a surge of current in each coil group due to the transformer-type coupling between the spiral coil 46 and preselected regions 47. The instantaneous current in the coil groups establishes a second dynamic magnetic field which interacts with the first mentioned magnetic field, and due to the resulting high flux density between regions 47 and the adjacent turns of coil 46, the end turn set 48 will be pressed-back. Further, since the individual conductors of the end turns are arranged in a bundle, are generally parallel, and carry current in the same direction, a force is generated between the conductors causing them to crush together or compact. As will be seen below, surge source 62 may be arranged to provide a surge of electrical energy across output terminals 67, 68 of up to 8820 joules at 7000 volts.

The following table illustrates the results achieved when the above described exemplification was applied to a four-pole stator utilizing the energy surge source 62 and a spiral coil 46 similar to that described herein, with various coil group connections and coil 46 placement being tried.

| Trial | Energy Input- (joules) | Volts | Results |
| --- | --- | --- | --- |
| 1 [1] | 3,000 | 4,100 | Small amount of end turn movement. |
| 2 [1] | 4,500 | 5,000 | Greater amount of end turn movement than trial 1. |
| 3 [1] | 6,480 | 6,000 | Considerable amount of end turn movement; greater than trials 1 or 2. |
| 4 [2] | 8,820 | 7,000 | No movement of end turns. |
| 5 [3] | 6,480 | 6,000 | Do. |

[1] Stator coil groups connected as illustrated in Figure 2.
[2] Spiral coil magnetically linking both sets of end turns with connection as in Figure 2.
[3] Stator coil groups normally connected.

The above trials were made using the illustrated four-pole strator carrying aluminum windings having "Formex" insulation. The spiral coil 46 used was a 0.125 inch diameter "Berlyco 20" alloy wound to sixteen turns at a turn pitch of 0.25 inch, and having a working length of 4 inches and a working diameter of 3.250 inches.

Referring now to FIGURES 3 and 4 for a more specific description of the induction coil carrying member 12, it will be observed that the member 12 includes a central generally non-magnetic rigid structure 70 which is generally cylindrical in configuration. The rigid structure 70 may be any suitable non-magnetic material such as a highly compressed resin, hardwood or the like. The central rigid structure 70 has a spiral groove 72 formed about the outer periphery thereof and extending substantially the entire length thereof. A first layer of insulating material 74 such as for example a urethane elastomer is cast or otherwise suitably formed about the outer periphery of the structure 70 in a thin film (.010–.020 inch thick), conforming to the spiral grooves 72. The spiral coal 46 is then wound tightly about the insulation layer 74 in the grooves 72 and a second layer of insulation 76 similar to layer 74 is formed over the coil 46 thereby encapsulating and insulating the coil. The rigid central structure 70 has a slot 78 opening to an internal bore or aperture 82 running the length of structure and opening to a recess 84 in one end face 86 of the structure 70. One end 80 of the coil 46 is run through the slot 78 and bore 82 and suitably attached as by welding 88 to the inner end 90 of a terminal 92. The other end portion 94 of the coil 46 is similarly attached to the inner end 96 of a second terminal 98 in a second recess 100. An elongate, generally rectangular extension 102 of the rigid central structure 70 extends between the terminals 92 and 98 to ensure electrical insulation therebetween.

In order to increase the amount of energy which can be introduced into the spiral coil 62, glass roving 104 is wound tightly and completely about the coil 46 over the upper layer 76 of urethane elastomer. This provides mechanical strength to the coil 46 and to the entire member. Finally, an outside layer 106 of urethane elastomer is cast over the entire member to encapsulate it and provide the desired outer diameter substantially equal to the stator core diameter, as well as to rigidify and stabilize the terminals 92 and 98. The advantage of this particular configuration is that by having the spiral coil 46 totally encased in urethane elastomer, the turns are less likely to be forced together by high intensity magnetic fields encountered when an electrical surge is introduced into the coil. Further, the usual hard, brittle insulation generally used for this purpose would normally break down under the high mechanical forces which occur between the turns of the coil 46 and the turns would then short together and cause failure of the coil at high energy levels. On the other hand, the urethane elastomer acts as a shock absorber and as an electric insulator and a mechanical retainer for the entire winding.

It will be noted in FIGURES 1 and 4 that there is an end extension 108 of the rigid structure 70 which has no turns of the spiral coil 46 thereabout. This is provided as a seating area for the core 10 during operation of my method, and accordingly, marking grooves 110 are provided on the member 12 to indicate the proper seating of the core. By this arrangement the preselected regions 47 of end turn portions 45a comprising set 48 are in electromagnetic coupling relationship with the coil 46, while the opposite set of end turn portions 45, i.e., the set extending axially beyond the face 26 of the core 10 and denoted by reference numeral 49, will be free from such a coupling relationship. This is important since, as explained above and shown in the above table, if the coil 46 were to be electromagnetically linked with both sets of end turn portions, the current induced into the coils would be in opposing relationship and would therefore cancel.

Figure 6:
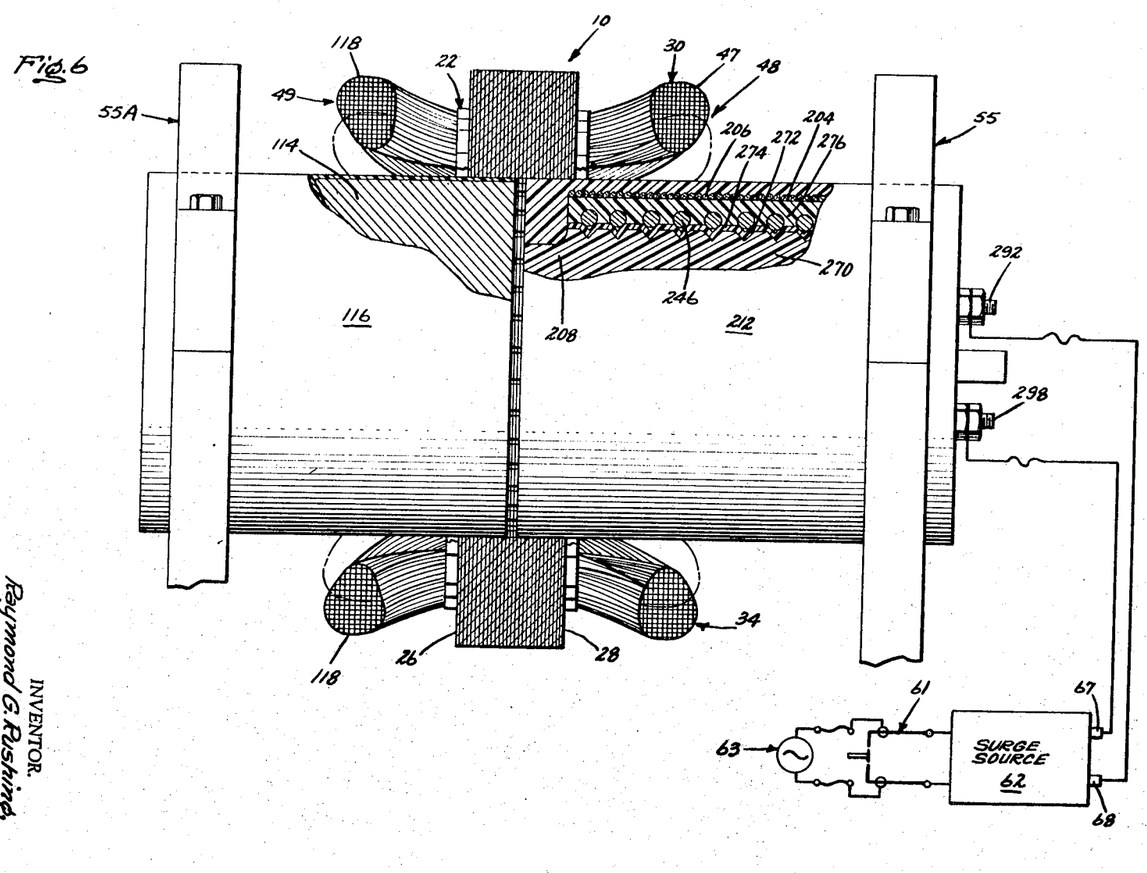
FIGURE 6 is a side elevational view, partially broken away and partially in schematic, similar to FIGURE 1, showing the equipment useful for practicing a further aspect of my invention.

In accordance with a further exemplification of my invention, reference should now be made to FIGURE 6 wherein there is disclosed a stator 10 identical to the stator described above and wherein like numerals refer to like parts. By this exemplification of my invention, I am able to displace both sets 48 and 49 of the end turn portions of the coil groups 30, 32, 34, and 36. In FIGURE 6, while I have only shown the coil groups 30 and 34, it will be appreciated that press back and compaction of the end turn sets of all four coil groups will be effected by my method.

In accordance with this exemplification, a spiral induction coil carrying member 212 substantially identical to the member 12 described above is supported by a holding fixture 55. The member carries a spiral induction coil 246 and includes terminals 292 and 298 for connecting the coil 246 to the terminals of the electrical energy surge source 62. The member 212 comprises a rigid central structure 270 with a spiral groove 272 and urethane elastomer layer 274 upon which the spiral induction coil 246 is tightly wound. A layer of urethane elastomer 276 is provided about the spiral coil 246 with glass roving 204 and an outermost layer of urethane elastomer 206 is provided. The only material difference between the member 212 and the member 12 is that the end extension 208 of member 212 is somewhat shorter than the extension 108 of member 12.

In accordance with this exemplification of my invention, a plug 114 is supported in a holding fixture 55A identical to the holding fixture 55. The plug 114, as illustrated, is a solid cylindrical member of suitable non-magnetic and electrically conductive material such as copper or aluminum, and is covered by a sleeve 116 of suitable electrical insulating material such as pressed fiber or the like so as to electrically isolate the electrically conductive plug from the coil conductors. It will be appreciated that the plug 114 may be solid as illustrated, or hollow if so desired, and that the insulating sleeve 116 may either be a separate hollow sleeve member having an inner diameter corresponding to the outer diameter to the plug as shown, or may be an integrally formed insulative coating on the outer surface of the plug. The sleeve also serves to hold the coil side portions in the stator slots, if they have not been previously pressed back into the slots.

The stator 10 is rigidly seated between the end portions of the plug 114 and the induction coil carrying member 212, with the preselected generally parallel regions 47 of the end turn set 48 being generally parallel to the spiral coil 246 and thus being electromagnetically coupled or linked with the coil 246 upon energization of the circuit 62. As in the above described exemplification of my invention, the coils 38, 40 and 42 will have current induced therein by the dynamic instantaneous current flow in the spiral coil 246 and the resulting dynamic magnetic field. By virtue of the connection of the coil groups, and the interaction between the preselected regions 47 of coil 246, the end turn portions 45a will be displaced and compacted as described above.

In this exemplification of the invention, the end turn portions 45 of the end turn set 49 will also be displaced from an initial to a final or desired position. This displacement is effected since the current flowing through the coils 38, 40, and 42, having been induced by the transient magnetic field established about coil 246, will cause transient eddy currents to flow in the plug 114. The eddy currents in the plug 114 cause the flux lines emanating from the end turn set 49 to be restricted or compressed into a path or region between the turns and the plug 114, thus causing a high flux density between the turns and the plug, thereby pressing back the movable end turn portions toward the stator face to a desired final position illustrated by lines in full and denoted by reference numeral 118. Further, both sets of end turns will also be compacted as described above.

Figure 7:
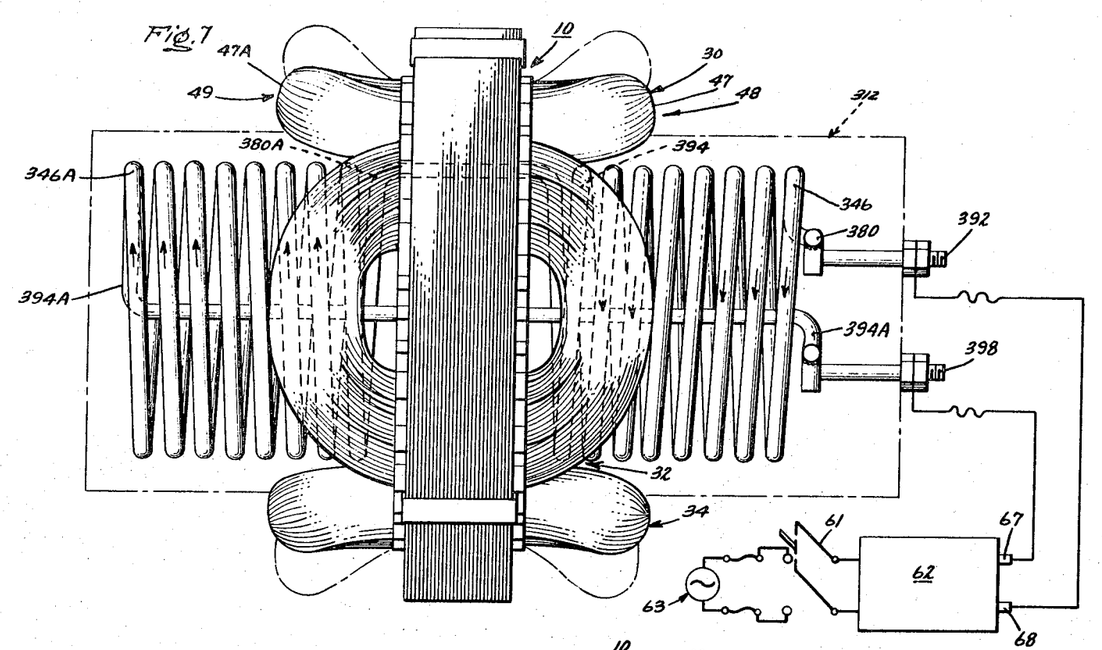
FIGURE 7 is an electrical view of a winding carrying stator core with a coil carrying member in the base thereof, similar to that shown in FIGURES 1–4 and 6 above, and showing additional apparatus useful in carrying out a still further aspect of my invention.
Figure 8:
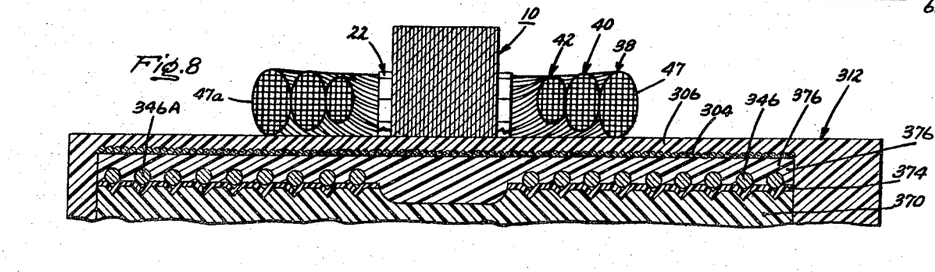
FIGURE 8 is a partial vertical sectional view, partially in side elevation, illustrating the core and apparatus shown in FIGURE 7.

In accordance with another method of displacing both sets 48 and 49 of end turn portions from an original to a desired position, reference may now be had to FIGURES 7 and 8 wherein like numerals refer to like parts. In this exemplification of this aspect of my invention, I provide an elongate induction coil carrying member 312 which carries therein a pair of spiral induction coils 346 and 346A. The member 312 is substantially similar to the members 12 and 212 described above, including a central rigid structure 370 of insulating material, urethane elastomer layers 374 and 376, and outer layers of glass roving 304 and urethane elastomer 306. However, the member 312 includes two spiral coils 346 and 346A.

As illustrated in FIGURE 7, the spiral coil 346 has one end 380 connected to a terminal 392 of member 312 for electrical connection to the electrical energy source 62. The other end 394 of the coil 346 extends axially through the central structure 370 and is connected to one end 380A of coil 346A. The other end 394A of coil 346A is connected through the center of structure 370 to another terminal 398 of member 312. By referring to FIGURE 7, and especially to the indicating arrows thereon, it will be seen that due to the opposite winding of coils 346 and 346A, the current flow in the coils will be opposite when the source 62 is energized. This configuration of the coils 346 and 346A is necessary to provide an additive rather than an opposing induced current flow in the coil groups 30, 32, 34, and 36 of the stator winding.

With further reference to FIGURES 7 and 8 and in accordance with this exemplification of my invention, upon energization of the coils 346 and 346A by connection to the electrical surge source 62, transient current will be induced in both end turn sets 48 and 49 of the coil groups. Thus, there will be electromagnetic coupling established between the preselected regions 47 of the end turn set 48 which are generally parallel to the turns of coil 346 and between the preselected regions 47A of the end turn set 49 which are generally parallel to the turns of coil 346A. This coupling will cause interaction between the preselected regions of both sets and the respective spiral coils thereby causing both sets of end turns to be displaced to the position illustrated by the lines in phantom in FIGURE 7. However, for clarity of illustration, only the end turns of coil groups 30 and 34 are shown to have such movement.

Referring specifically now to FIGURE 5, I will more fully describe the operation of the high energy surge source 62 which is shown in FIGURES 1, 6, and 7 in block diagram form. It will be noted that one form of source, which may be used to provide the desired electrical energy surge, is that disclosed more fully in my co-pending U.S. application Ser. No. 568,594 filed concurrently with the instant application.

The source 62 has a bank of capacitors $C_1$ and $C_2$ connected in parallel to provide a high power pulse of preselected magnitude. The capacitors are charged to a selected voltage level, up to 7000 volts, and then selectively discharging by ionizing an ignitron $S_1$ to a conductive state.

The energy surge source 62 is effectively divided into and can be best described by referring to three subcircuits $SC_1$, $SC_2$, and $SC_3$, each of which is connected across input leads $L_1$ and $L_2$. The input leads $L_1$ and $L_2$ connect to input terminals 117 and 119 which are adapted for connection to a suitable alternating supply 63 such as a 120 volt, 60 cycle commercial supply, through normally open switch 61. The switch 61 is a double pole single throw switch provided in order to make power immediately available to the three sub-circuits and to deenergize the source 62 when not in use. The source also has output terminals 67 and 68 adapted for connection to the terminals of the several plug members described above.

Prior to energizing the source 62, the control arm 123 of a control autotransformer $T_1$ is set to regulate the voltage to the desired level for the capacitors $C_1$ and $C_2$. Upon closing switch 61, the primary windings $P_2$ and $P_3$ of power supply transformers $T_2$ and $T_3$ are immediately energized. These transformers respectively provide the input power supplies for sub-circuits $SC_2$ and $SC_3$. The power supply transformer $T_3$ provides 110 volt alternating current to a solid state rectifier bridge 125, which in turn feeds full wave rectified direct current through normally closed time delay relay $TD_1$ and charges capacitor $C_4$ almost instantly.

Simultaneously, the power supply transformer $T_2$ provides 1400 volts alternating current to the half wave rectifier 126, which is excited by the output of transformer $T_4$. Subsequently, current limiting resistor $R_2$ allows the capacitor $C_3$ to quick reach a full charge of approximately 1400 volts. At this time, thyratron $S_2$ is non-conducting as it has insufficient grid potential to cause ignition.

While the capacitor $C_3$ is charging, the transformer $T_5$ provides a voltage predetermined by the setting of control autotransformer $T_1$ to a solid state rectifier bridge 128, which in turn feeds full wave rectifier current through current limiting resistor $R_1$ in order to charge the capacitor bank $C_1$ and $C_2$ to the predetermined voltage.

Subsequently, after the preset time interval, normally closed time delay relay $TD_1$ opens, removing capacitor $C_4$ from its charging circuit. Coinstantaneously, normally open time delay relay $TD_2$ closes, allowing the capacitor $C_4$ to discharge across resistor $R_4$, driving the grid of thyratron $S_2$ positive, causing the thyratorn $S_2$ to ignite. As the thyratron $S_2$ ignites, the capacitor $C_3$ discharges across resistor $R_3$ and through the primary of pulse transformer $T_6$, which transformer provides isolation for the ignitron $S_1$. The output from transformer $T_6$ drives the ignitron $S_1$ to conduction, allowing capacitor bank $C_1$, $C_2$ to be discharged across output terminals 67 and 68 of the source 62.

In order to provide a specific illustration of the energy surge source 62, the values of the various components in the circuit of FIGURE 5 have been indicated where appropriate on the drawing. However, it will be recognized by those skilled in the art that other types or values of these components may be utilized in my arrangement to practice the method of the instant invention without departing from the scope and spirit thereof.

From the foregoing description of the method exemplifying my invention, it should be apparent that the end turn portions of electrical coils, such as those carried by a motor stator, can be readily displaced or pressed back and compacted without utilizing mechanical means which physically contact the windings. Further, in the illustrated exemplifications of my method, the end turn displacement can be economically accomplished without the necessity of making separate interpole connections between the coil groups, if so desired. Still further, my method does not harm the conductor insulation, since the voltage induced into the stator windings is relatively low as well as being induced for a short duration.

While I have shown and described various embodiments of the invention, it will be obvious to those skilled in the art that changes and modifications may be made without departing from the invention. It is therefore intended in the appended claims to cover all such changes and modifications that fall within the true spirit and scope of my invention.

What I claim as new and desire to secure by Letters Patent of the United States is:

1. A method of displacing from an original position the end turn portions of electrical coils also having side portions and being carried by a core adapted for use in a dynamoelectric machine, which electrical coils include two sets of end turn portions connecting the side portions, the end turn portions having regions extending generally perpendicularly to the side portions, the method comprising the steps of: fixedly supporting induction coil means in close proximity to the end turn regions of at least one of said sets; electrically connecting at least one electrical coil to provide a closed path for the flow of induced current therethrough; applying at least one surge of electrical energy to said induction coil means, generating a dynamic margnetic field in magnetic coupling relationship only between the end turn regions of said at least one set of end turn portions and said induction coil means, and inducing current flow in the connected electrical coils thereby displacing said at least one set of end turn portions by the electromagnetic interaction between said induction coil means and the magnetically coupled end turn regions.

2. The method of claim 1 wherein the step of fixedly supporting induction coil means in close proximity to the end turn regions of at least one of said sets further comprises supporting a spiral induction coil in the vicinity of the end turn regions of only one of said sets.

3. The method of claim 2 including the step of disposing rigid generally non-magnetic and electrically conductive material in the vicinity of the end turn regions of the other of said sets to establish transient eddy current flow in the non-magnetic material and producing an electromagnetic reaction for displacing the end turn portions of the other of said sets.

4. The method of claim 1 including the step of fixedly supporting a first induction coil carrying current in a first direction in close proximity to the end turn regions of one of said sets of end turn portions, fixedly supporting a second induction coil carrying current in a second direction opposite to said first direction in close proximity to the end turn regions of the other of said sets of end turn portions, and applying at least one surge of electrical energy to both said induction coils thereby to displace both said sets of end turn portions.

5. The method of claim 1 further including the step of compacting individual conductors of the end turn portions of said at least one set.

6. A method of displacing end portions of an electrically conductive coil from an original position with the coil being connected to provide a closed path for induced current, said end portions including regions extending generally perpendicularly to the side portions of said electrically conductive coil, the method comprising the steps of: disposing non-movable induction coil means in the vicinity of at least one of said regions, said induction coil means being generally parallel to said at least one region and generally non-parallel to the side portions of said electrically conductive coil; effecting displacement of at least one end portion by applying at least one surge of electrical energy to said induction coil means thereby generating a dynamic magnetic field in magnetic coupling relationship only between said induction coil means and said at least one region, said dynamic magnetic field causing a current to flow in said electrically conductive coil thereby displacing said at least one end portion away from the original position by the interaction of electromagnetic forces at the area of magnetic coupling.

7. The method of claim 6 wherein the step of disposing non-movable induction coil means in the vicinity of at least one of said regions further includes disposing a spiral coil in the vicinity of the region of only one of said end portions.

8. The method of claim 7 including the step of disposing rigid generally non-magnetic and electrically conductive material in the vicinity of the region of the other of said end portions to establish transient eddy current flow in the non-magnetic material and producing an electromagnetic reaction for displacing the other of said end portions.

9. The method of claim 6 including the step of fixedly supporting a first induction coil carrying current in a first direction in close proximity to the end turn regions of one of said sets of end turn portions, fixedly supporting a second induction coil carrying current in a second direction opposite to said first direction in close proximity to the end turn regions of the other of said sets of end turn portions, and applying at least one surge of electrical energy to both said induction coils thereby to displace both said sets of end turn portions.

10. A method of displacing from an original position end turn portions of electrical coils movably carried by a core adapted for use in a dynamoelectric machine, which electrical coils include two sets of end turns connected by side portions, the end turns having regions extending generally perpendicularly to the side portions, the method comprising the steps of: fixedly supporting induction coil means in close proximity to the end turn regions of at least one of said sets of end turns; connecting at least one electrical coil to provide a closed path for the flow of current therethrough; applying at least one surge of electrical energy to said induction coil means and to said at least one electrical coil, generating a dynamic magnetic field in magnetic coupling relationship only between the end turn regions of said at least one set and said induction coil means thereby to displace said at least one set of end turn portions by the electromagnetic interaction at the area of magnetic coupling.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |
| 3,348,183 | 10/1967 | Hodges et al. | |
| 3,353,251 | 11/1967 | Linkous | 29—205 |

JOHN F. CAMPBELL, *Primary Examiner.*

J. CLINE, *Assistant Examiner.*